United States Patent
Ansaldi et al.

(10) Patent No.: US 6,640,762 B2
(45) Date of Patent: Nov. 4, 2003

(54) SYSTEM FOR INDICATING THE LEVEL OF FUEL CONTAINED IN THE TANK OF A MOTOR VEHICLE

(75) Inventors: Maurizio Ansaldi, Turin (IT); Massimo Carignano, Rivalta di Turin (IT); Alessandro Tuninetti, Turin (IT)

(73) Assignee: Fiat Auto S.p.A., Turin (IT)

( * ) Notice: Subject to any disclaimer, the term of this patent is extended or adjusted under 35 U.S.C. 154(b) by 50 days.

(21) Appl. No.: 10/083,156

(22) Filed: Feb. 27, 2002

(65) Prior Publication Data

US 2002/0118105 A1 Aug. 29, 2002

(30) Foreign Application Priority Data

Feb. 28, 2001 (IT) ..................................... TO2001A0175

(51) Int. Cl.$^7$ ......................... F02M 37/04; G01F 23/00
(52) U.S. Cl. ................................. 123/179.16; 73/119 A; 701/123
(58) Field of Search ............................ 123/494, 179.16, 123/509; 73/113, 117.2, 117.3, 119 A; 701/112, 115, 123

(56) References Cited

FOREIGN PATENT DOCUMENTS

EP          0 275 240 A2      7/1988

*Primary Examiner*—Thomas N. Moulis
(74) *Attorney, Agent, or Firm*—Sughrue Mion, PLLC

(57) ABSTRACT

The system comprises a control unit which, when the engine is stopped, memorises the level indicated by a display device upon stopping and then the level indicated by a sensor a predetermined time after stopping. The unit then memorises the level indicated by the sensor a predetermined time after the subsequent restarting of the engine. The unit controls the display device in a predetermined manner depending on the relative values of the memorised levels.

6 Claims, 3 Drawing Sheets

SYSTEM FOR INDICATING THE LEVEL OF FUEL CONTAINED IN THE TANK OF A MOTOR VEHICLE

BACKGROUND OF THE INVENTION

The present invention relates to a system for indicating the level of fuel contained in the tank of a motor vehicle provided with an internal combustion engine.

Fuel tanks of modern motor vehicles often have extremely irregular shape and disposition. This, in one sense, results in the fact that the indication of the level of fuel in the tank, typically provided by a sensor of one of the various known types, is not easily convertible into a reliable indication of the quantity of fuel available. Indication of the level or quantity of fuel is moreover strongly influenced by variations in the attitude of the vehicle.

Unreliability in the information relating to the quantity of fuel available has a particularly negative impact on the motor vehicle user upon starting out (beginning of a trip or journey) and, during journeys, on inclined roads.

Systems for indicating fuel level currently in use include mechanical, electromechanical or electronic "damping" means (in the case of electronic damping this is achieved via hardware and/or software) which makes it possible to attenuate the oscillations of the indication provided to the user upon variation in the level of the fuel in the tank due to swashing and in general, to oscillations in the level due to manoeuvres or dynamic conditions involving rapid variations of the vehicle such as accelerations, braking etc. Such systems thus allow rapid dynamic variations in the level of the fuel which, in fact, do not correspond to effective variations in the quantity of fuel available in the tank, to be "filtered".

These damping systems do not, however, allow an indication of the level or quantity of fuel to be provided which makes it possible to discriminate between the possible various causes of effective variations in the level of the fuel, such as travelling on an incline, refuelling or re-filling the tank, or the loss of fuel upon rupture or breakage, or theft thereof.

In relation to the fuel level or quantity indicator the satisfaction of the user is related to the fact that during a journey the system should give a sensation of "reliability" in the sense that the information appears to be effectively correlated to the consumption corresponding to the use of the engine's power. The user can become truly alarmed by sudden variations in the indication of the level or quantity of fuel available if they occur in an essentially non-synchronised manner with corresponding variations in the operating conditions.

When a motor vehicle travels up or down an incline, or is subject to strong longitudinal and/or transverse accelerations the morphology of the fuel tank can be such as to cause a consistent displacement of the volume of fuel contained in it, which can be the source of errors in the indication provided to the user by a display device provided in the instrument panel. Such errors can be unacceptable.

SUMMARY OF THE INVENTION

The object of the present invention is to provide a system for indicating the level or quantity of fuel in a motor vehicle tank which makes it possible to obviate the above delineated disadvantages.

BRIEF DESCRIPTION OF THE DRAWINGS

Further characteristics and advantages of the invention will become apparent from the following detailed description, given purely by way of non-limitative example, with reference to the attached drawings, in which.

DETAILED DESCRIPTION OF THE INVENTION

Figure 1:
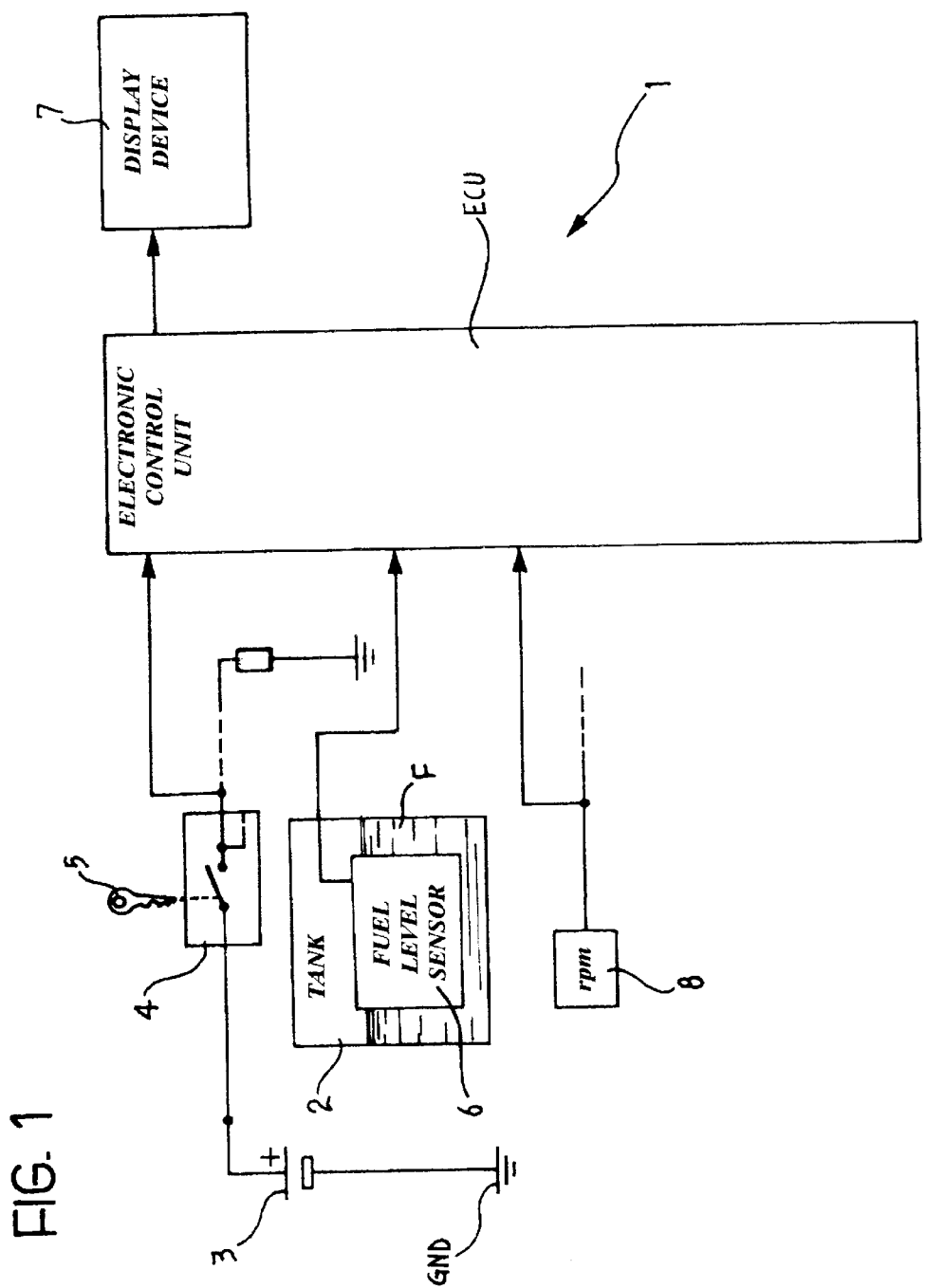
FIG. 1 is a representation, in block diagram form, of a first embodiment of a system according to the invention.

In FIG. 1 a system according to the invention for indicating the level or quantity of fuel F contained in the tank 2 of a motor vehicle provided with an internal combustion engine (not illustrated) is generally indicated 1.

The reference numeral 3 indicates an accumulator battery which is provided on the motor vehicle and which in the illustrated example has its negative pole connected to ground GND.

An electric ignition and starter switch for the motor vehicle engine is indicated 4, and is connected to the positive pole of the battery 3 and manually operable by means of a key 5 or the like.

The reference numeral 6 indicates an electric level sensor disposed in the tank 2. This sensor is of known type, for example of the resistive type with a movable cursor associated with a float body, and in operation provides an electrical signal indicative of the instantaneous level of fuel F in the tank.

The reference numeral 7 indicates a display device, such as, for example, an instrument with an indicator needle, which can be provided in the instrument panel of the motor vehicle dashboard to provide the user with a visual indication of the level or quantity of fuel in the tank.

The system 1 further includes an electronic control unit ECU formed, for example, by a microprocessor and associated accessory devices, such as memories, input/output ports etc.

The control unit ECU can be a dedicated unit, that is one intended for the management solely of the fuel level indicator system, or can be another electronic unit installed on board the motor vehicle and arranged for the management of at least one other function as well as that of indicating the level of fuel in the tank.

The level sensor 6 is connected to the unit ECU, an output of which controls the display device 7.

Another input of the unit ECU is connected to the downstream side of the switch 4, to allow the said control unit to be able to detect when the internal combustion engine of the motor vehicle is turned on and off.

The unit ECU is also provided with signals or data indicative of the speed of rotation (RPM) of the motor vehicle crankshaft, provided for example by a suitable sensor 8 of type known per se, for example of the so-called phonic wheel type.

In operation the control unit ECU is arranged to "filter", in a pre-determined manner, the level signal provided to it by the sensor 6, and dynamically to control the display device 7 on the basis of the filtered level signal. Various techniques for filtering signals via hardware or software are known and these will not be further described herein.

The unit ECU is moreover arranged to memorise the level $L_a$ indicated by the display device 7 at the moment when the motor vehicle engine is turned off, the instantaneous level $L_b$ indicated by the sensor 6 after a predetermined time tab (equal for example to 10 seconds) after the engine is turned off, and the instantaneous level $L_c$ indicated by the sensor 6 a predetermined time $t_c$ (equal for example to 0.5 seconds) after subsequent restarting of the engine.

In general the control strategy of the display device 7, which is performed by the electronic control unit ECU in the manner which will be described in more detail below, is essentially based on the following considerations.

The level $L_a$ indicated by the display device 7 upon stopping the engine is an indicated value normally having a good reliability, being not significantly influenced by the motor vehicle dynamics.

The instantaneous level $L_b$ indicated by the signal provided by the sensor 6 several seconds after the engine has been stopped, can be influenced only by any possible inclination of the road on which the motor vehicle is located, which inclination is susceptible of inducing a transfer of fuel within the tank. A significant difference between $L_b$ and $L_a$ in fact makes the instantaneous level indicated by the sensor upon stopping the engine unreliable, whilst a substantial equality between $L_b$ and $L_a$ is indicative of the fact that the motor vehicle is in an essentially horizontal orientation.

The instantaneous level $L_c$ indicated by the level sensor 6 several seconds after the motor vehicle engine has been restarted is influenced by the inclination of the ground on which the motor vehicle is standing, or by possible refuelling operations, or by loss of fuel in the interval between the engine being stopped and restarted. A significant difference between $L_c$ and $L_b$ provides an indication that during the period when the motor vehicle has not been in use it has been affected by refuelling, or there has been a loss of fuel. It is necessary to take adequate account of this difference in order to update the indication provided by the display device after the engine has been restarted.

In view of the above, the electronic control unit ECU is conveniently arranged to control the display device 7 in such a way that after starting the motor vehicle engine this display device 7 indicates:

the level $L_a$ indicated by it when the engine was last stopped if the instantaneous levels $L_b$ and $L_c$ indicated by the level sensor 6 are substantially equal to one another;

the instantaneous level $L_b$ indicated by the level sensor 6 after the said predetermined time $t_{ab}$ after starting the engine, if the said instantaneous levels $L_b$ and $L_c$ indicated by the sensor 6 are substantially different from one anther, and the level $L_a$ indicated by the display device 7 when the engine was previously stopped is substantially the same as the instantaneous level $L_b$ indicated by the sensor 6 some time after the engine was stopped; and a level $L_d$ corresponding to the level $L_a$ indicated by the display device 7 when the engine was previously stopped, increased by the difference $L_c$–$L_b$ between the said instantaneous values indicated by the sensor 6 after the engine has been started and, respectively, after the engine was previously stopped, if the instantaneous levels $L_b$ and $L_c$ indicated by the sensor 6 are substantially different from one another and the value $L_a$ indicated by the display device 7 when the engine was previously stopped is substantially different from the instantaneous value $L_b$ indicated by the sensor a short time after the engine had been stopped.

The electric control unit ECU is moreover pre-arranged to periodically determine a minimum value $L_m$ and a maximum value $L_M$ of the fuel level F in the tank 2 in a predetermined manner as a function of the detected values of at least one operating parameter of the motor vehicle engine, such as the speed of rotation of its crankshaft, indicated by the sensor 8.

The unit ECU is also pre-arranged to perform the following operations during a motor vehicle journey:

compare the level indicated by the sensor 6 with the said minimum value $L_m$ and the maximum value $L_M$;

assume as the value of the fuel level, for control of the display device 7:

the said minimum value $L_m$, when the value indicated by the sensor 6 is less than this minimum value $L_m$;

the said maximum value $L_M$, when the value indicated by the sensor is greater than this maximum value $L_M$; and the value indicated by the sensor 6 when it lies between the said minimum value $L_m$ and maximum value $L_M$.

As will be explained further below, the said minimum and maximum values $L_m$ and $L_M$ are conveniently determined by the unit ECU according to a predetermined function of the speed of rotation of the engine of the motor vehicle.

Figure 2:
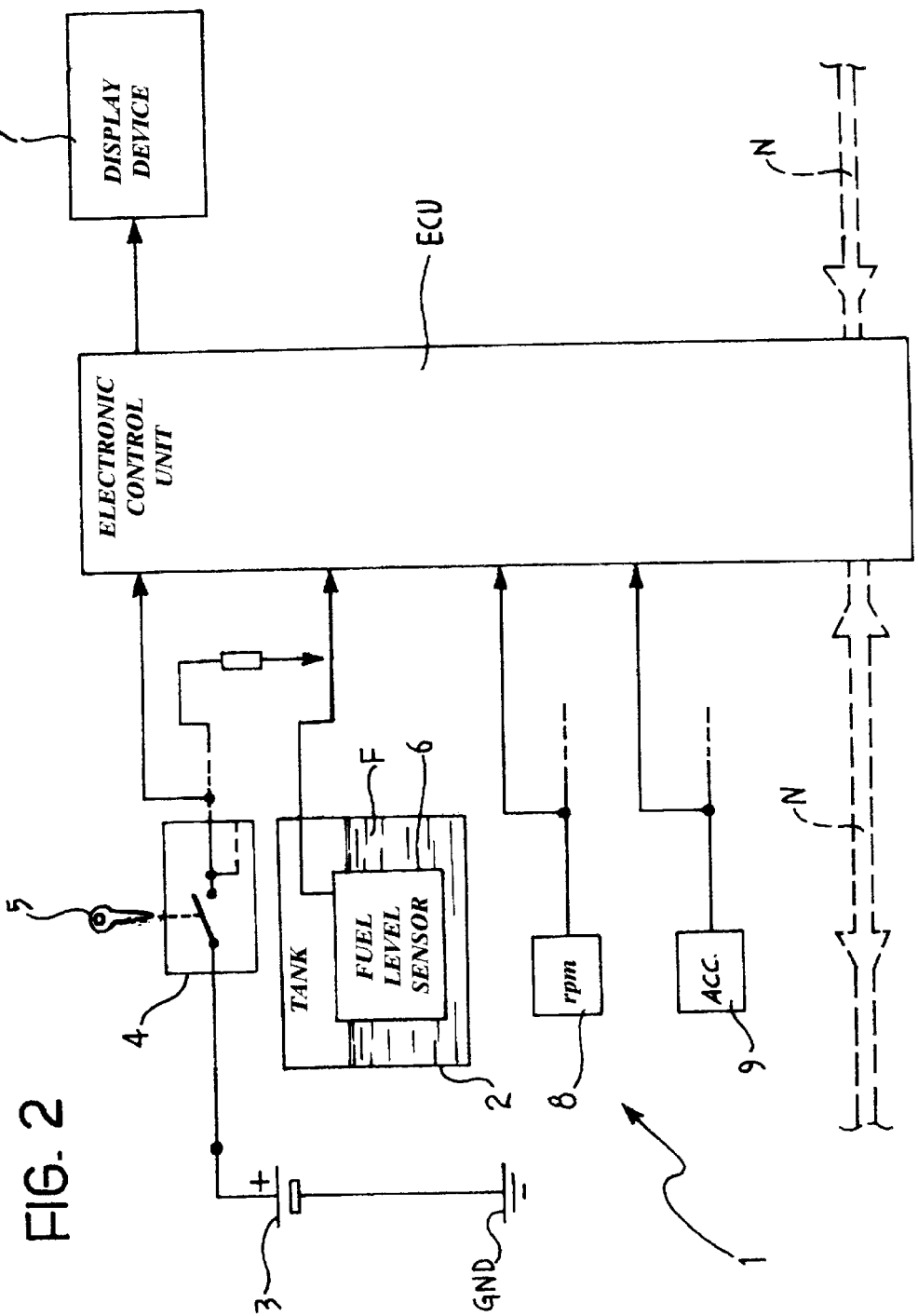
FIGS. 2 and 3 are representations, in the form of block diagrams, of two variant embodiments of the system according to the invention.

In the variant embodiment shown in FIG. 2, the electronic control unit ECU is also provided with further signals or data indicative of the load or power demand at the engine, this information being provided to the unit ECU for example by a motor vehicle accelerator pedal position sensor 9. In the variant to which FIG. 2 refers, the control unit ECU is now conveniently arranged to periodically determine, during a journey, the said minimum value $L_m$ and maximum value $L_M$ of the fuel level in dependence both on the detected speed of rotation of the engine of the motor vehicle and the load or power demand at this engine, indicated by the accelerator pedal position.

The data relating to the speed of rotation of the engine, and to the power demand at this engine, or rather to the accelerator pedal position, can alternatively be supplied to the unit ECU by other electronic control units installed on board the motor vehicle, and interconnected with the unit ECU by means of a communications network, for example a serial communications network operating according to the CAN protocol such as the network illustratively indicative in broken outline and indicated in N FIG. 2.

Figure 3:
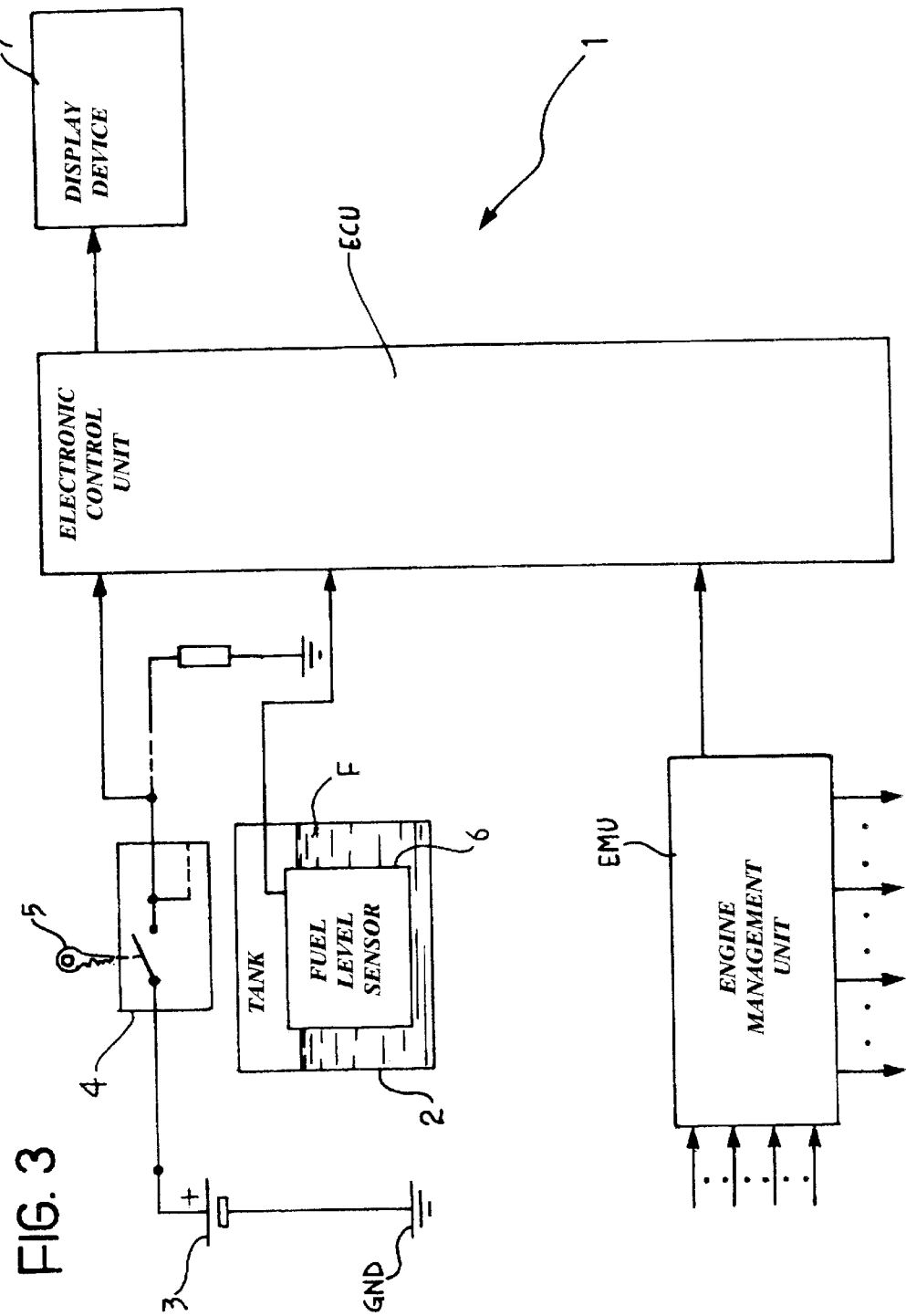

In FIG. 3 is shown a variant embodiment in which the unit ECU is connected to the engine's electronic engine management unit EMU, which, in a manner known per se, is arranged to calculate the quantity of fuel consumed in unit time by the engine itself and to provide corresponding signals to the unit ECU. The unit ECU is now conveniently arranged to calculate the said minimum value $L_m$ and maximum value $L_M$ of the fuel level on the basis of the consumption signals provided by the unit EMU.

In the three variant embodiments described above the unit ECU is able, during a journey of the motor vehicle, to process the signal provided by the level sensor 6 in an effective manner, correlating, for each instantaneous operating condition of the engine, the level variations indicated by the sensor with the plausible consumption of the engine itself. The unit ECU is therefore capable of performing a coherence control of the fuel level indication with the effective operating conditions of the motor vehicle engine.

The algorithm of the above-described control makes it possible to replace an "erroneous" fuel level indication, "erroneous" in that it is not justified because it is due, for example, to a sudden variation or anomaly in the fuel level due to a variation in the vehicle attitude, with a "correct" indication calculated on the basis of the plausible or detected fuel consumption by the engine.

Naturally, the principle of the invention remaining the same, the embodiments and details of construction can be widely varied with respect to what has been described and illustrated purely by way of non-limitative example, without by this departing from the ambit of the invention as defined in the attached claims.

What is claimed is:

1. A system for indicating the level of fuel contained in the tank of a motor vehicle provided with an internal combustion engine and a manually operable electric switch for ignition and starting of the engine, comprising an electric sensor operable to provide an electric signal indicative of the instantaneous level of fuel in the tank, a display device;

electronic control means coupled to the fuel level sensor, to the said switch and to the display device; the said electronic control means being arranged to:

memorise the level indicated by the display device upon stopping the engine, the instantaneous level indicated by the sensor a predetermined time after stopping the engine, and the instantaneous level indicated by the sensor a predetermined time after subsequent restarting of the engine; and to control the display device in such a way that after starting the engine the said display device indicates the level indicated thereby when the motor was last stopped, if the said instantaneous levels, indicated by the sensor are substantially equal to one another;

the instantaneous level indicated by the sensor after the said predetermined time from restarting of the engine, if the said instantaneous levels are substantially different from one another and the level indicated by the display device upon last stopping the engine is substantially equal to the instantaneous level indicated by the sensor some time after the engine has been stopped; and a level corresponding to that indicated by the display device when the engine was last stopped, increased by the difference between the said instantaneous values indicated by the sensor after starting the engine and, respectively, after the engine was last stopped, if the said instantaneous levels are substantially different from one another and the value indicated by the display device upon last stopping the engine is substantially different from the said instantaneous value indicated by the sensor after the engine has been go switched off.

2. A system according to claim 1, in which the said electronic control means are arranged to filter the level signal provided by the sensor in a predetermined manner, and dynamically to control the display device on the basis of the filtered level signal.

3. A system according to claim 1, in which the said electronic control means are arranged to periodically determine, in a predetermined manner, as a function of the detected values of at least one operating parameter of the engine, a minimum value and a maximum value of the fuel level in the tank;

compare the level indicated by the sensor with the said minimum and maximum values;

assume, as a value of fuel level for controlling the display device:

the said minimum value if the value indicated by the sensor is less than this minimum value;

the said maximum value, if the value indicated by the sensor is greater than the said maximum value and the value indicated by the sensor if this lies between the said minimum value and the said maximum value.

4. A system according to claim 3, in which the said control means are arranged to acquire a speed signal indicative of the speed of rotation of the motor vehicle engine and periodically to determine the said minimum and maximum fuel level values in dependence on the said speed of rotation.

5. A system according to claim 3, in which the said control means are arranged periodically to determine the said minimum and maximum values of the fuel level as a function of the detected speed of rotation of the motor vehicle engine and the position of the accelerator pedal.

6. A system according to claim 3, in which the said control means are coupled to an electronic control unit for controlling the operation of the internal combustion engine, operable to provide fuel level signals indicative of the quantity of fuel consumed in unit time by the engine, and the said control means are arranged to calculate the said minimum and maximum fuel level values on the basis of the said fuel consumption signals.

* * * * *